United States Patent [19]

Balukin et al.

[11] Patent Number: 5,020,862
[45] Date of Patent: Jun. 4, 1991

[54] PENALTY BRAKE CONTROL SYSTEM

[75] Inventors: Richard F. Balukin, Pittsburgh; John R. Reiss, North Versailles, both of Pa.

[73] Assignee: American Standard Inc., Wilmerding, Pa.

[21] Appl. No.: 413,140

[22] Filed: Sep. 27, 1989

[51] Int. Cl.$^5$ .............................................. B60T 7/12
[52] U.S. Cl. ........................................ 303/15; 303/86
[58] Field of Search ....................................... 303/13–15, 303/18, 19, 33, 35, 86

[56] References Cited

U.S. PATENT DOCUMENTS

| | | | |
|---|---|---|---|
| 3,782,782 | 1/1974 | Brown | 303/19 |
| 4,491,372 | 1/1985 | Walley | 303/18 |
| 4,525,011 | 6/1985 | Wilson | 303/19 |
| 4,626,039 | 12/1986 | Worbois | 303/19 |

Primary Examiner—Robert J. Oberleitner
Assistant Examiner—Alfred Muratori
Attorney, Agent, or Firm—J. B. Sotak

[57] ABSTRACT

A penalty brake control system for a railway locomotive in which a first pressure switch controls the venting of the control chamber of a penalty brake application valve. Reset of the penalty brake application valve, following actuation in response to an unsafe operating condition, is achieved by actuating this first pressure switch to effect closure of the control chamber vent path. A second pressure switch actuates this first pressure switch only when two pressure signals are present thereat, the first pressure signal arising when the penalty brake application value is actuated and the second pressure signal arising when the locomotive brake valve handle is moved out of release position, provided the unsafe operating condition has been corrected.

13 Claims, 2 Drawing Sheets

PENALTY BRAKE CONTROL SYSTEM

BACKGROUND OF THE INVENTION

The present invention relates to penalty brake control systems for railway service and particularly to a reset arrangement for releasing a penalty initiated brake application when a non self-lapping type brake valve device is employed.

Typical penalty brake control systems employ a standard P-2-A type penalty brake application valve device in conjunction with safety monitoring devices to enforce an automatic penalty brake application in the event the operator fails to periodically acknowledge his alertness and well being (safety control) or the train speed exceeds a predetermined safe limit (overspeed and/or train control).

Due to the recent trend toward modern locomotive cab design, the standard 26-C type pedestal-mounted brake valve has been modified for "desk-style" mounting. The concept of this new family of brake valves, designated as 30-type brake valves, initially employed a self-lapping automatic brake regulating valve, as its basis, this feature being similar to that of the standard 26-C brake valve. However, the 30-type brake valves do not carry over the penalty interlock arrangement, in which the "lockover" port of the penalty application valve is controlled through the suppression valve of the 26-C brake valve. Instead, the "lockover" port is controlled via a pneumatic switching valve that is separate from the brake valve and which is piloted by pressure from the brake valve via a suppression pipe when the brake valve is moved to suppression position. Piloting the switching valve effects closure of the "lockover" port, to allow pressure buildup in the control chamber of the penalty application valve for reset and release of the penalty brake application.

More recently, these 30-type brake valves have been expanded to utilize a non self-lapping type regulating valve which requires the operator to move the brake valve handle out of service position to lap position when the desired brake application is obtained. This makes it possible to add a holding position in which an electropneumatic valve in the brake cylinder exhaust line may be energized via a train line wire to hold the brake pressure while re-charging the train brake pipe. In this expanded design of the 30-type brake valve, however, there is no provision for a suppression position, as such, the intention being to utilize service position to obtain the pressure signal at suppression pipe 26, instead of providing a separate suppression position. This was found to be a problem in attempting to suppress or reset a penalty brake application, because in placing the brake valve handle in service position to obtain the desired suppression pipe signal, a concurrent reduction of brake pipe pressure occurs. Since this suppression pressure signal must be sustained for a period of time sufficient to allow the penalty brake application valve to reset, it is possible to have an undesirable over-reduction of brake pipe pressure.

SUMMARY OF THE INVENTION

An object of the present invention is to provide a penalty brake system in which a penalty brake application valve can be reset by manipulation of a non self-lapping brake valve handle without concurrently effecting a reduction of brake pipe pressure;

A further object of the invention is to assure positive operation of the penalty brake application valve during reset in accordance with the foregoing objective; and A final object of the invention is to prevent an impending safety control penalty brake application from being improperly suppressed by requiring actuation of the penalty application valve as a condition for reset.

Briefly, these objectives are fulfilled by providing an operator's brake valve device having an operating handle movable to a service position in which a service brake application is initiated, the degree of service brake application being determined by the duration the handle is in service position, and a release position in which the service brake application is released; penalty valve device having an application position in which a penalty brake application is initiated independently of the brake valve initiated service application and a release position in which the penalty brake application is released; sensing means operative in response to an unsafe operating condition of a vehicle for effecting operation of the penalty valve device to its application position; interlock means for preventing the penalty valve device from resetting to its release position following actuation to its application position; and means for disabling the interlock means when the penalty valve is operated to its application position and the brake valve operating handle is in a position other than its release position to thereby permit the penalty valve device to reset to release position, provided the unsafe operating condition has been corrected.

BRIEF EXPLANATION OF THE DRAWINGS

These and other objects and advantages of the invention will be apparent when taken in connection with the drawings in which.

DESCRIPTION AND OPERATION

Figure 1:
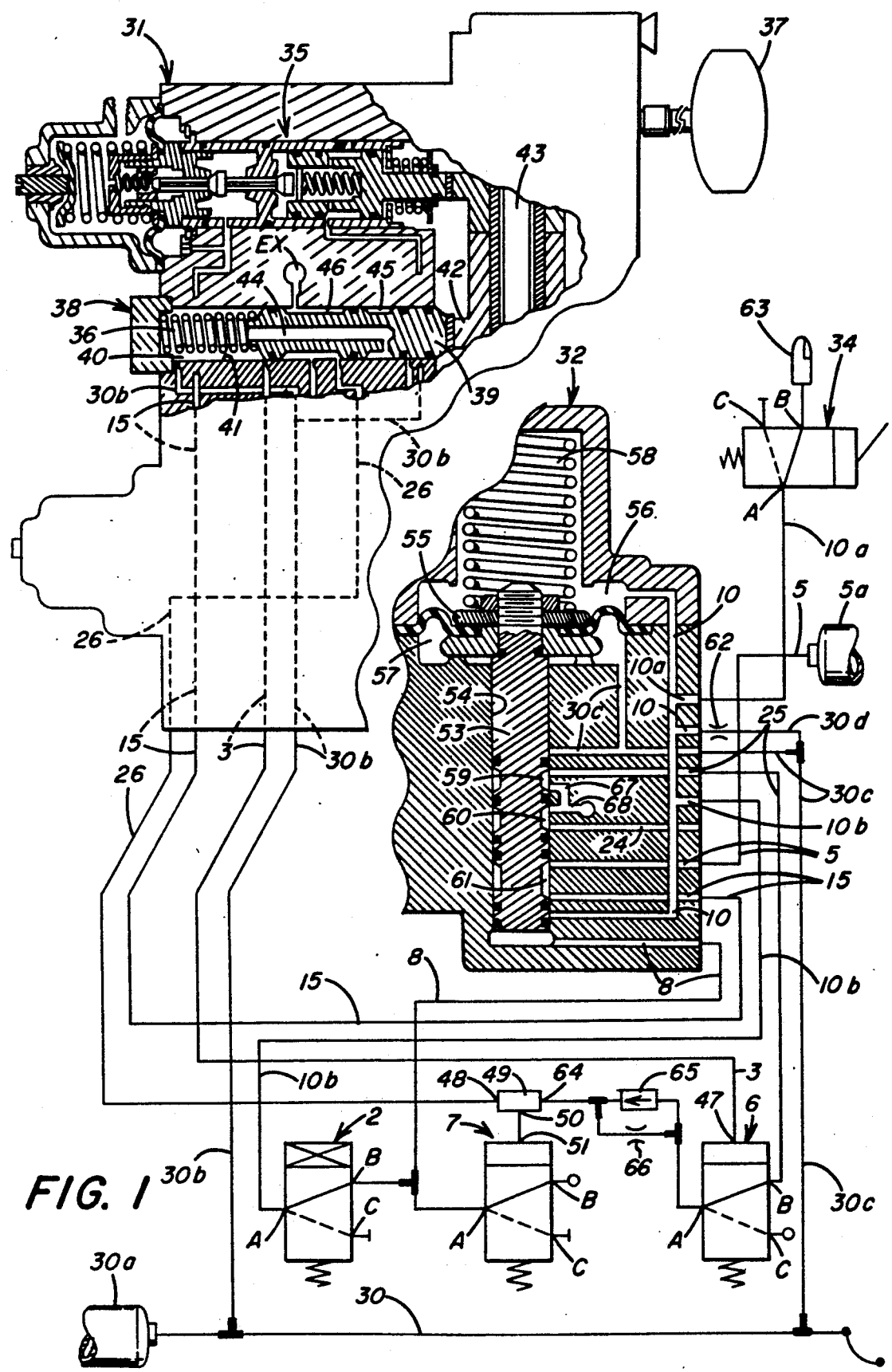
FIG. 1 shows a schematic of a penalty brake system including a non self-lapping type brake valve, a portion of which is shown in section, and a conventional penalty application valve, a portion of which is shown in section.

Referring now to FIG. 1 of the drawings, there is shown a penalty brake control system for a railway vehicle, the operation of which produces a penalty brake application when an improper operating condition is detected. For example, the operator is required to periodically indicate his alertness and well-being. The standard operator's foot valve device 34 is one well-known way of accomplishing this task. Failure to acknowledge a warning whistle by operating the foot valve within a prescribed period of time will result in a penalty application valve, such as the well-known P-2-A brake application valve 32, being actuated to bring about the penalty brake application independently of the brake valve device that is under the operator's control. The penalty brake application valve may also be actuated in a well-known manner in response to a train control magnet valve 2 being deenergized when the train speed exceeds a predetermined safe limit.

The penalty brake control system, according to the present invention, is adapted for use with a 30-type brake valve device 31 that is characterized by a combination self-lapping and non self-lapping regulating valve 35. The features of this type regulating valve are known, having been disclosed in U.S. Pat. No. 4,113,320 and subsequently employed in the well-known 26-E type brake valve device. Regulating valve 35 is designed to give the operator the option of re-charging the train brake pipe without concurrently releasing the train brakes. In this sense, a holding position is provided between release and lap positions on the brake valve handle quadrant. In this holding position, a magnet valve on each car of the train is electrically operated via a train line wire to interrupt the exhaust of brake cylinder pressure, while concurrently positioning the brake valve components in release position, so as to re-charge the brake pipe.

Figures 2, 3:
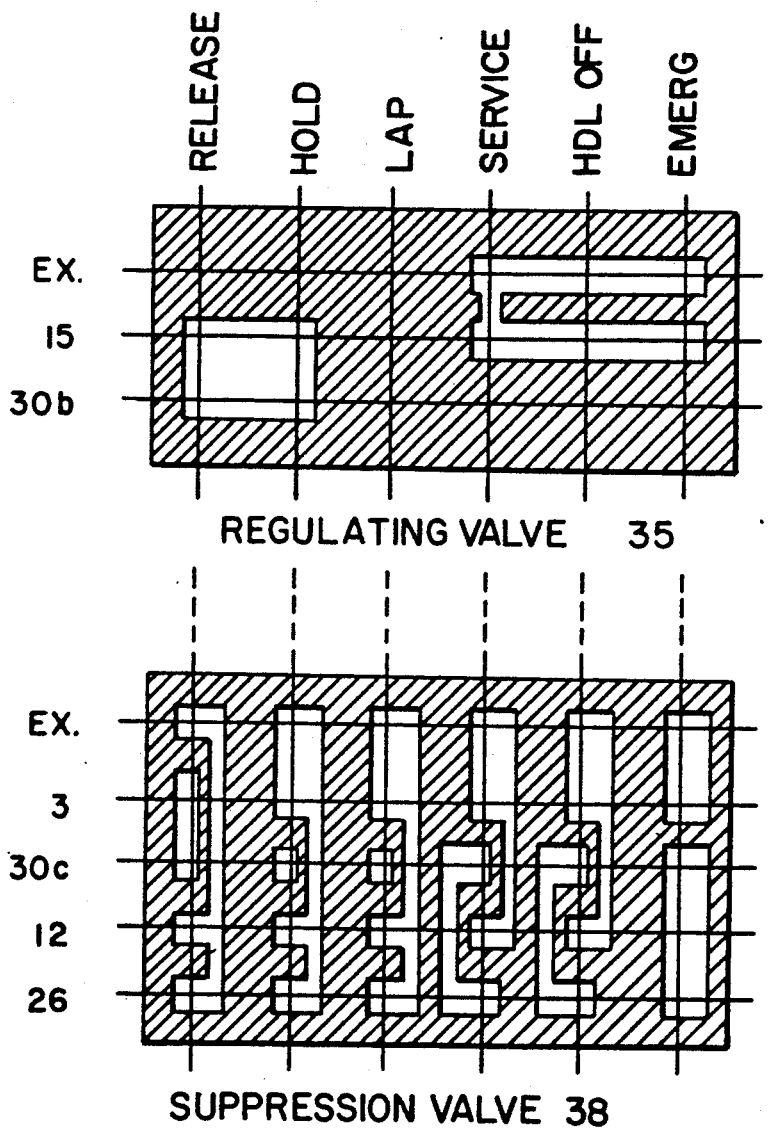
FIGS. 2 and 3 position diagrams indicating graphically the port connections made by the regulating valve and suppression valve portions of the brake valve device of FIG. 1.

As previously noted, the 30-type brake valve employed in the present invention has no suppression position, the pressure signal realized at suppression pipe 26 being attained in service, handle off, and emergency positions, as shown in the position diagram of FIG. 2.

Regulating valve 35 includes a manually adjustable spring 36 that establishes the upper pressure level to be maintained by the self-lapping action of regulating valve 35, when brake valve handle 37 is set in release position. Brake valve handle 37 also has a service position in which compressed air carried in the train brake pipe (not shown) is exhausted in a well-known manner until such time as handle 37 is moved out of service position to lap or holding position. It will be appreciated, therefore, that regulating valve 35 operates in a non self-lapping manner during service braking to effect a reduction of brake pipe pressure, the resultant degree of brake application being dependent on the duration brake valve handle 37 is allowed to remain in service position.

Brake valve 31 includes, in addition to regulating valve 35, a suppression valve 38 comprising a spool member 39, the spring 36 acting on one end of spool member 39 to urge movement in one direction within a bore 41, and a cam member 42 acting on the other end of spool member 39 to effect movement in the opposite direction. Cam member 42 is disposed on a cam shaft 43 to which handle 37 is connected to rotate cam member 42 in accordance with the various positions of handle 37. Spool member 39 has a central passage 44 that opens into the spring chamber 40 at the one end of spool member 39 and is connected to an annular groove 45 that encircles the circumference of spool member 39 in spaced-apart relationship with another annular groove 46 that also encircles the circumference of spool member 39.

A source of compressed air is stored in a main reservoir 30a and is maintained within a predetermined operating range, in a well-known manner. A pipe 30 connects compressed air from main reservoir 30a to bore 41 at the spring side of spool member 39 via main reservoir pipe 30 and branch pipe and passage 30b.

In addition to brake valve 31, penalty application valve 32, foot valve 34, and train control magnet valve 2, there is provided a pair of pneumatic switching valves 6 and 7, which are conventional pneumatically actuated, spring-returned, two-position, three-way valves of a well-known type, such as a standard H-5 Relayair valve. A control port 47 of switching valve 6 is connected by a pipe and passage 3 to spool bore 41, while a pipe and passage 26, generally referred to as the suppression pipe, is connected between spool groove 41 and one inlet 48 of a double check valve 49. The outlet 50 of double check valve 49 is connected to the control port 51 of switching valve 7.

In that penalty application valve 32 is well known, only the valving and passageways necessary for an understanding of the present invention have been shown. Penalty application valve 32 comprises a spool member 53 that operates in a bore 54. A diaphragm piston 55 is subject to pressure in chambers 56 and 57 formed on opposite sides of piston 55, and to a spring 58 in chamber 56. Three annular grooves 59, 60 and 61 separated by O-rings encircle the circumference of spool member 53.

The ports of the switching valves 6 and 7 are designated by the letters A, B, and C, port A being normally connected to port B. At valve 7, port B is vented to atmosphere and port C is blanked. At valve 6, port C is vented to atmosphere and port B is connected by a pipe and passage 25 to the bore 54 of penalty application valve 32.

A branch pipe and passage 30c connects pipe 30 to bore 54 and chamber 57 of penalty application valve 32, while another branch pipe 30d having a choke 62 is connected to a passage 10 that branches off to chamber 56 and to spool bore 54.

Foot valve device 34 is a pedal operated spring returned, 2-position, 3-way valve having ports A, B, and C, port A being normally connected to port B. Port B is connected to a whistle 63 and port C is blanked. A pipe and passage 10a branches from passage 10 and is connected to port A of foot valve 34.

Train control magnet valve 2 is a conventional, electrically actuated, spring-returned, 2-position, 3-way pneumatic switching valve having ports A, B, and C, port A being normally connected to port B. Another branch passage and pipe 10b of passage 10 is connected to port A of this train control magnet valve 2.

Connected between port A of switching valve 6 and the other inlet 64 of double check valve 49 is a one-way check valve 65 having a bypass choke 66 in parallel therewith.

Connected to port A of switching valve 7 is port B of train control magnet valve 2 and pipe and passage 8 leading to bore 54 of penalty application valve 32.

A passage and pipe 5 connect spool bore 54 to an equalizing reservoir 5a. A pipe is connected between passage 15 leading to penalty valve spool bore 54 and the regulating valve 35 of brake valve 31.

Exhaust passages 67 and 68 connect spool bore 54 of penalty application valve 32 to atmosphere.

Under normal or safe operating conditions, the pedal of foot valve 34 is depressed by the operator as an indication of his alertness and well being, thereby connecting foot valve port A to port C and accordingly cutting off venting of pipe and passage 10a via whistle 63. Also, port A of train control magnet valve 2 is cut off from port B and connected to port C, as long as the magnet valve operator remains energized in accordance with the train speed being within the prescribed speed limit. In consequence of this safe operating condition, compressed air from main reservoir 30a is able to charge chamber 57, via pipe and passage 30c, and chamber 56 via pipe 30d, choke 62, and passage 10. With equal pressure in chambers 56 and 57, spring 58 is effective to force piston 55 to its lowermost position, as shown, in which position passage 25 is connected to exhaust passage 67 via spool groove 59; passage 24 is connected to exhaust passage 68 via spool groove 60; passage 15 is connected to passage 5 via spool groove 61; and passage 10 is cut off from passage 8.

In release position of brake valve handle 37, regulating valve 35 supplies compressed air from main reservoir 30a to equalizing reservoir 5a via pipe 30, pipe and passage 30b, regulating valve 35; brake valve passage 15, pipe 15, penalty valve passage 15, spool groove 61 and passage and pipe 5. As is well known, a high capacity relay valve (not shown) charges and maintains the pressure of the train brake pipe (also not shown) at a value corresponding to the equalizing reservoir pressure, this brake pipe pressure maintaining the train brakes in release condition.

In the event a penalty brake application is invoked, as when an unsafe operating condition arises, such as the operator failing to maintain the pedal of foot valve 34 depressed or the train speed exceeding a safe limit, the appropriate foot valve 34 or train control valve 2 will be positioned by its return spring. In the case of foot valve 34, passage 10 will be vented via whistle 63 and in the case of train control valve 2, passage 10 will be vented via ports A and B of switching valve 7. The compressed air in chamber 56 is thus exhausted faster than it can be supplied via choke 62, which is also effective to prevent the pressure in chamber 57 from exhausting with chamber 56 via passages 30c and 30d. An upward-acting pressure differential thus develops across piston 55, sufficient to overcome the force of spring 58 and to thus force piston 55 upwardly to its penalty brake application position. In this penalty brake application position, spool member 53 connects passage 10 to passage 8 via the end of spool member 53; interrupts communication between passages 5 and 15; connects passage 5 to passage 24 via spool groove 61; and connects passage 30c to passage 25 via spool groove 59.

The connection of passage 10 to passage 8, which is vented to atmosphere via ports A and B of switching valve 7, establishes a flow path in a "lockover" circuit via which chamber 56 is maintained vented even following correction of the unsafe operating condition, until such time as the operator moves brake valve handle out of release position, for a purpose hereinafter explained.

When brake valve handle 17 is in release position, as indicated by the position diagram of FIG. 3, brake valve passage and pipe 3 are pressurized via main reservoir pipe 30, branch pipe 30b, and spring chamber 40 of suppression valve 38, this pressure being effective at control port 47 of switching valve 6 to override the return spring and thereby establish a connection between ports A and C. Port B being accordingly cut off from port A, the pressure effective in passage and pipe 25 is cut off from inlet 64 of double check valve 49, which is vented to atmosphere at port C.

Also in release position of handle 17, as indicated by the position diagram of FIG. 2, brake valve passage and pipe 26 that is connected to inlet 48 of double check valve 49 is vented to atmosphere via the suppression valve spool groove 46 and exhaust port EX. Consequently, control port 51 of switching valve 7 remains vented and the valve return spring is effective to maintain the aforementioned "lockover" circuit intact.

Accordingly, penalty application valve 32 is maintained in its penalty application position, as above explained until corrective action is taken. In this position of penalty application valve 32, the venting of passage 5 via spool groove 61 and passage 24 of penalty application valve 32 effects a reduction of equalizing reservoir pressure and a corresponding reduction in the train brake pipe pressure, in a well-known manner, to cause a penalty brake application independently of the operator's control through brake valve handle 37.

In order to release a penalty brake application, corrective action must be taken to restore a safe operating condition, as by re-establishing control of the foot valve pedal to block venting of pipe 10a at port C of foot valve 34, or by bringing the train speed under control to energize train control valve 2 and thereby block venting of pipe 10b at port C.

In addition, brake valve handle 37 must be moved out of release position, as a means of acknowledging the penalty condition. This depressurizes pipe 3, as indicated in the position diagram of FIG. 3, by venting brake valve passage 3 via suppression valve spool groove 46 and port EX. The loss of this pressure signal at control port 47 of switching valve 6 allows the return spring to transition the valve to a position connecting ports A and B. The pressure heretofore supplied to pipe 25 and blocked at port B is now supplied to control port 51 of switching valve 6 via one-way check valve 65 and double check valve 49. This pressure at control port 51 now overrides the valve return spring and positions switching valve 7 to connect ports A and C, thereby closing the "lockover" circuit to cut off the venting of passage 10 via passage and pipe 8.

Once these conditions have been met, i.e., correcting the unsafe operating condition and acknowledging the penalty application by operating brake valve handle 37, the pressure supplied to chamber 56 of penalty application valve 32 via main reservoir pipes 30, 30c, 30d, choke 62, and passage 10 increases until at some value approaching the pressure effective in chamber 57, spring 58 is effective to reset the penalty application valve 32 to its release position, thereby cutting off passage 10 from "lockover" passage 8.

It will be understood that during this period of time allowed for reset of penalty application valve 32, brake valve handle 37 need not be in service position but may be placed in either holding or lap position. As shown in the position diagram of FIGS. 2 and 3, passage 26 is pressurized, but brake valve passage 15 is disconnected from exhaust, as is pipe and passage 15 leading to equalizing reservoir 5a via penalty application valve 32. Thus, brake pipe pressure which follows equalizing reservoir pressure is also cut off from exhaust. Consequently, the penalty brake application can be reset without concurrently effecting a brake pipe pressure reduction.

During transition of penalty application valve 32 from application to reset position, it will be appreciated that the sequence of port connections made by spool member 53 is such that passage 25 is connected to atmosphere via spool groove 59 and exhaust passage 67 prior to passage 10 being cut off from passage 8.

Such an event could allow switching valve 7 to reset prematurely, connecting port A to exhaust port B and thereby venting pipe 8. Since passage 8 could still be connected to passage 10 via the end of spool valve 53, due to the aforementioned sequencing of the spool port connections, the pressure in chamber 56 would be vented, causing the penalty application valve to reapply.

Such a possibility is prevented by the addition of a one-way check valve 65 between double check valve 49 and switching valve 6, with a delay choke 66 in parallel therewith. In this manner, the venting of air at control port 51 of switching valve 7 is restricted to delay its reset until spool member 53 of penalty application valve 32 has completed its sequence of port connections. When this occurs, passage 8 is disconnected from passage 10 and the penalty application valve 32 is positively reset.

Following the delayed blowdown of pressure at control port 51 via choke 66, ports A and B of switching valve 6, pipe and passage 25 and exhaust passage 67, switching valve 7 is reset by its return spring, thereby connecting port A to port B and accordingly venting pipe 8. This re-establishes the "lockover" circuit in readiness for a subsequent penalty brake application.

In addition, the connection between passages 5 and 15 at spool member 53 is re-established, in reset position of penalty application valve 32, to re-charge equalizing reservoir 5a and accordingly effect a release of the penalty imposed brake application in a well-known manner.

Following this, the brake valve handle may be returned to release position, which pressurizes pipe 3 and resets switching valve 6 to a position connecting port A to exhaust port C. In this manner, the venting of control port 51 of switching valve 7 is transferred from the penalty application exhaust passage 67 to the exhaust port of switching valve 6, which requires movement of brake valve handle 37 out of release position to actuate switching valve 7, in addition to the actuation of penalty application valve 32, as previously mentioned.

Double check valve 49 provides for actuating switching valve 7 by movement of brake valve handle to service position, as a means of suppressing an impending train control related penalty brake application since, in service position, a brake application is provided through operator control of brake valve 31.

As indicated in the position diagram of FIG. 3, suppression pipe 26 is pressurized by movement of the brake valve suppression valve 38, when handle 37 is moved to service position. In service position, the suppression valve spool 39 is positioned to connect main reservoir supply air from reservoir 30a to suppression pipe 26 via branch pipe and passage 30b, spring chamber 40, central passage 44 in spool 39, and spool groove 45. This air supplied to pipe 26 passes through double check valve 49 to control port 51 of switching valve 7 to connect ports A and C thereof.

In this manner, the vent path including passage and pipe 10b, ports A and B of magnet valve 2, and passage and pipe 8 via which chamber 56 would otherwise be exhausted at port B of switching valve 7 is interrupted to suppress the impending penalty brake application, it being understood, however, that this suppression of the penalty follows accepted operating practice, since it requires movement of the brake valve handle to service position, which in turn produces a service brake application to bring the train speed within the prescribed limit.

Attempting to cheat the system by prematurely returning the brake valve handle to release position before the train speed is reduced sufficiently to establish re-energization of train control magnet valve 2 will still subject the train to a penalty brake application, since movement of handle 37 to release position will exhaust suppression pipe 26 and thereby vent control port 51 of switching valve 7 to re-establish the connection of port A thereof to exhaust port B. The resulting vent path including passage and pipe 10b, ports A and B of magnet valve 2, and passage and pipe 8 will thus cause the pressure in chamber 56 to be exhausted and thereby actuate penalty application valve 32.

Moving the brake valve handle to handle off position or to emergency position has the same effect, as above explained, and indicated in the position diagram of FIG. 3, since in these positions also, pressure is supplied to suppression pipe 26. Again, this follows sound operating practice since movement of the brake valve handle to emergency position produces an emergency brake application instead of the suppressed penalty application; and in handle-off position, the locomotive is hauled dead and thus gives responsibility for speed control to the lead unit.

We claim:

1. A penalty brake control system for a railway vehicle comprising:
   (a) an operator's brake valve device having an operating handle movable to a service position in which a service brake application is initiated, the degree of said service brake application being determined by the duration said handle is in said service position and a release position in which the service brake application is released;
   (b) a penalty valve device having an application position in which a penalty brake application is initiated independently of said brake valve initiated service application and a release position in which said penalty brake application is released;
   (c) sensing means operative in response to an unsafe operating condition of said vehicle for effecting operation of said penalty valve device to said application position;
   (d) interlock means for preventing said penalty valve device from resetting to said release position following said actuation thereof to said application position comprising:
      (i) said penalty valve device having a control chamber and a piston valve operable in response to pressurization of said control chamber to establish said release position of said penalty valve device and operable in response to depressurization of said control chamber to establish said application position of said penalty valve device; and
      (ii) a flow path established by said piston valve in said application position of said penalty valve device via which said control chamber is connected to atmosphere to vent fluid pressure therefrom; and
   (e) means for disabling said interlock means in response to said penalty valve being actuated to said application position and to said operating handle of said brake valve device being in a position other than said release position to thereby permit said penalty valve device to reset to said release position thereof when said unsafe operating condition has been corrected.

2. A penalty brake control system as recited in claim 1, wherein said disabling means comprises:
   (a) said penalty valve device providing a first pressure signal via said piston valve in said application position;
   (b) said brake valve device providing a second pressure signal when said operator's handle is out of said release position;
   (c) first valve means for providing a disabling signal when said first pressure signal is present concurrently with said second pressure signal; and (d) second valve means in said flow path for interrupting said venting of fluid pressure from said control chamber in response to said disabling signal.

3. A penalty brake control system as recited in claim 2, further characterized in that said flow path is interrupted by said piston valve in said release position of said penalty valve device.

4. A penalty brake control system as recited in claim 2, wherein said first and second valve means comprise a respective first and second switching valve, each having first, second, and third ports, and a control port, each said switching valve having a first position in which said first port is cut off from said third port and connected to said second port, and a second position in which said first port is cut off from said second port and connected to said third port.

5. A penalty brake control system as recited in claim 4, wherein said control port of said first switching valve is subject to said second pressure signal and said second port of said first switching valve is subject to said first pressure signal, said first switching valve being actuated to said first position in the absence of said second pressure signal, whereby the presence of said first pressure signal is effective to provide said disabling signal.

6. A penalty brake control system as recited in claim 5, wherein said control port of said second switching valve is connected to said first port of said first switching valve, said first port of said second switching valve is connected to said control chamber of said penalty valve device and said second and third ports of said second switching valve are connected to atmosphere and blanked, respectively, said second switching valve being operated to said second position in response to the presence of said disabling signal at said control port thereof to thereby interrupt said venting of fluid pressure from said control chamber of said penalty valve device.

7. A penalty brake control system as recited in claim 6, wherein said third port of said first switching valve is connected to atmosphere, whereby said disabling signal is dissipated in said second position of said first switching valve in response to the presence of said second pressure signal.

8. A penalty brake control system as recited in claim 7, further comprising means for restricting said dissipation of said disabling signal.

9. A penalty brake control system as recited in claim 8, wherein said means for restricting said dissipation of said disabling signal comprises:
(a) a choke between said first port of said first switching valve and said control port of said second switching valve; and
(b) a one-way check valve in bypass of said choke.

10. A penalty brake control system as recited in claim 4, wherein said sensing means comprises:
(a) third valve means for connecting said control chamber to atmosphere upon failure of an operator to maintain said third valve means in an actuated condition; and
(b) fourth valve means for connecting said control chamber to atmosphere via said first and second ports of said second switching valve in response to an overspeed condition of the motor of said railway vehicle.

11. A penalty brake control system as recited in claim 10, further comprising:
(a) said brake valve device providing a third pressure signal when said operator's handle is in said service position; and
(b) a double check valve device having an output connected to said control port of said second switching valve, one input connected to said first port of said first switching valve, and another input connected to said brake valve device to receive said third pressure signal.

12. A penalty brake control system as recited in claim 10, wherein said third valve means is a third switching valve having a manual actuator and a spring return, a first port connected to said control chamber, a second port connected to atmosphere, and a third port that is blanked, said first and third ports being connected in a first position in response to said manual actuator being operated, and said first and second ports being connected in the absence of said operation of said manual actuator.

13. A penalty brake control system as recited in claim 10, wherein said fourth valve means is a fourth switching valve having a solenoid operator, a spring return, a first port connected to said control chamber, a second port connected to said first port of said second switching valve, and a third port that is blanked, said first and third ports being connected in a first position in response to energization of said solenoid operator and said first and second ports being connected when said solenoid operator is deenergized.

* * * * *